United States Patent
Potter (10) Patent No.: US 6,841,917 B2
(45) Date of Patent: Jan. 11, 2005

(54) ELECTROSTATIC LEVITATION AND ATTRACTION SYSTEMS AND METHODS

(75) Inventor: Michael D. Potter, Churchville, NY (US)

(73) Assignee: Rochester Institute of Technology, Rochester, NY (US)

( * ) Notice: Subject to any disclaimer, the term of this patent is extended or adjusted under 35 U.S.C. 154(b) by 27 days.

(21) Appl. No.: 10/166,583

(22) Filed: Jun. 7, 2002

(65) Prior Publication Data

US 2002/0187618 A1 Dec. 12, 2002

Related U.S. Application Data (60) Provisional application No. 60/297,327, filed on Jun. 11, 2001.

(51) Int. Cl.[7] ................................................ H02N 1/00
(52) U.S. Cl. ........................ 310/309; 307/400; 29/886
(58) Field of Search ...................... 310/309; 438/455; 307/400; 29/886; 381/191

(56) References Cited

U.S. PATENT DOCUMENTS

| | | | | |
|---|---|---|---|---|
| 3,786,495 A | * | 1/1974 | Spence | 341/33 |
| 4,285,714 A | | 8/1981 | Kirkpatrick | 65/40 |
| 4,701,640 A | * | 10/1987 | Flygstad et al. | 307/400 |
| 4,789,803 A | * | 12/1988 | Jacobsen et al. | 310/309 |
| 5,207,103 A | | 5/1993 | Wise et al. | 73/724 |
| 5,284,692 A | * | 2/1994 | Bell | 428/69 |
| 5,355,577 A | | 10/1994 | Cohn | 29/592.1 |
| 5,519,240 A | | 5/1996 | Suzuki | 257/315 |
| 5,567,336 A | | 10/1996 | Tatah | 219/121.66 |
| 5,591,679 A | | 1/1997 | Jakobsen et al. | 437/228 |
| 6,127,744 A | | 10/2000 | Streeter et al. | 307/125 |
| 6,197,139 B1 | | 3/2001 | Ju et al. | 156/99 |
| 2002/0187618 A1 | * | 12/2002 | Potter | 438/455 |

FOREIGN PATENT DOCUMENTS

| | | | | |
|---|---|---|---|---|
| JP | 62-297534 | * | 12/1987 | F16C/32/04 |
| JP | 4-236172 | * | 8/1992 | H02N/1/00 |

* cited by examiner

*Primary Examiner*—Karl Tamai
(74) *Attorney, Agent, or Firm*—Nixon Peabody LLP

(57) ABSTRACT

An electrostatic interaction system includes a first structure having a first fixed electrostatic charge and a second structure having a second fixed electrostatic charge. The polarity of the first and second fixed electrostatic charges determines a positional relationship of the first structure to the second structure.

23 Claims, 6 Drawing Sheets

FIG. 8

ELECTROSTATIC LEVITATION AND ATTRACTION SYSTEMS AND METHODS

The present invention claims the benefit of U.S. Provisional Patent Application Ser. No. 60/297,327, filed Jun. 11, 2001, which is hereby incorporated by reference in its entirety.

FIELD OF THE INVENTION

This invention relates to electrostatic devices and a methods and, more particularly, to electrostatic levitation and attraction systems and methods thereof.

BACKGROUND OF THE INVENTION

In the macroscopic realm, there is often an undesirable restriction of the relative movement between two surfaces. This tendency of two surfaces to stick to each other is called friction and can be significantly reduced by introducing an intermediate material, i.e. a lubricant, that is slippery between the surfaces.

In the microscopic realm, there also is an undesirable restriction of the relative movement between two surfaces. Unfortunately, unlike the macroscopic realm, the introduction of an intermediate material between the surfaces may actually increase the propensity of micro components to stick together. Furthermore, in the micro and nano realms short-range forces, such as the van der Waals and electrostatic forces, become extremely important and often lead to serious limitations in the overall design and miniaturization of components. This effect is often referred to as stiction.

SUMMARY OF THE INVENTION

An electrostatic interaction system in accordance with one embodiment of the present invention includes a first structure having a first fixed electrostatic charge and a second structure having a second fixed electrostatic charge. The polarity of the first and second fixed electrostatic charges determines a positional relationship of the first structure to the second structure.

A method for making an electrostatic interaction system in accordance with another embodiment of the present invention includes providing a first structure having a first fixed electrostatic charge and providing a second structure having a second fixed electrostatic charge. The polarity of the first and second fixed electrostatic charges determines a positional relationship of the first structure to the second structure.

An electrostatic levitation system in accordance with another embodiment of the present invention includes a first structure having a first fixed electrostatic charge and a second structure having a second fixed electrostatic charge. The polarity of the first and second fixed electrostatic charges is the same and holds the first and second structures in a spaced apart positional relationship.

An electrostatic attraction system in accordance with another embodiment of the present invention includes a first structure having a first fixed electrostatic charge and a second structure having a second fixed electrostatic charge. The polarity of the first and second fixed electrostatic charges is opposite which attracts and holds the first and second structures together.

The present invention provides an electrostatic levitation system that has a compensating force that is sufficient to keep micro components from actually coming within the short-range distances from each other. This technique provides levitation without using magnetism. The present application has a variety of applications including electrostatic bearings. One of the features of the invention is the use of imbedded repulsive electrostatic forces to overcome stiction.

The present invention also provides an electrostatic attraction system that has a complementary force that is sufficient to attract components to each other.

DETAILED DESCRIPTION

Figure 6:
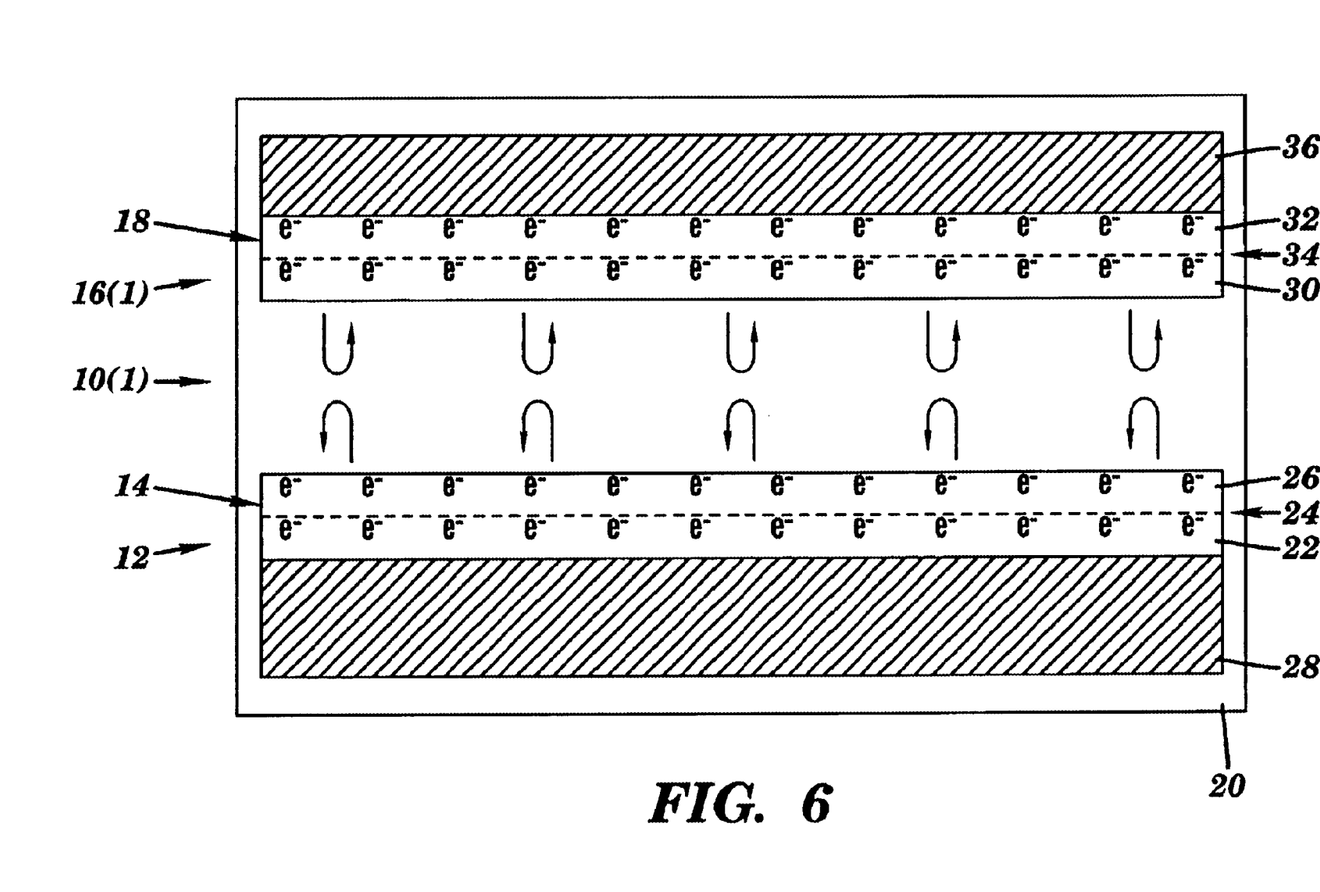
Figure 7:
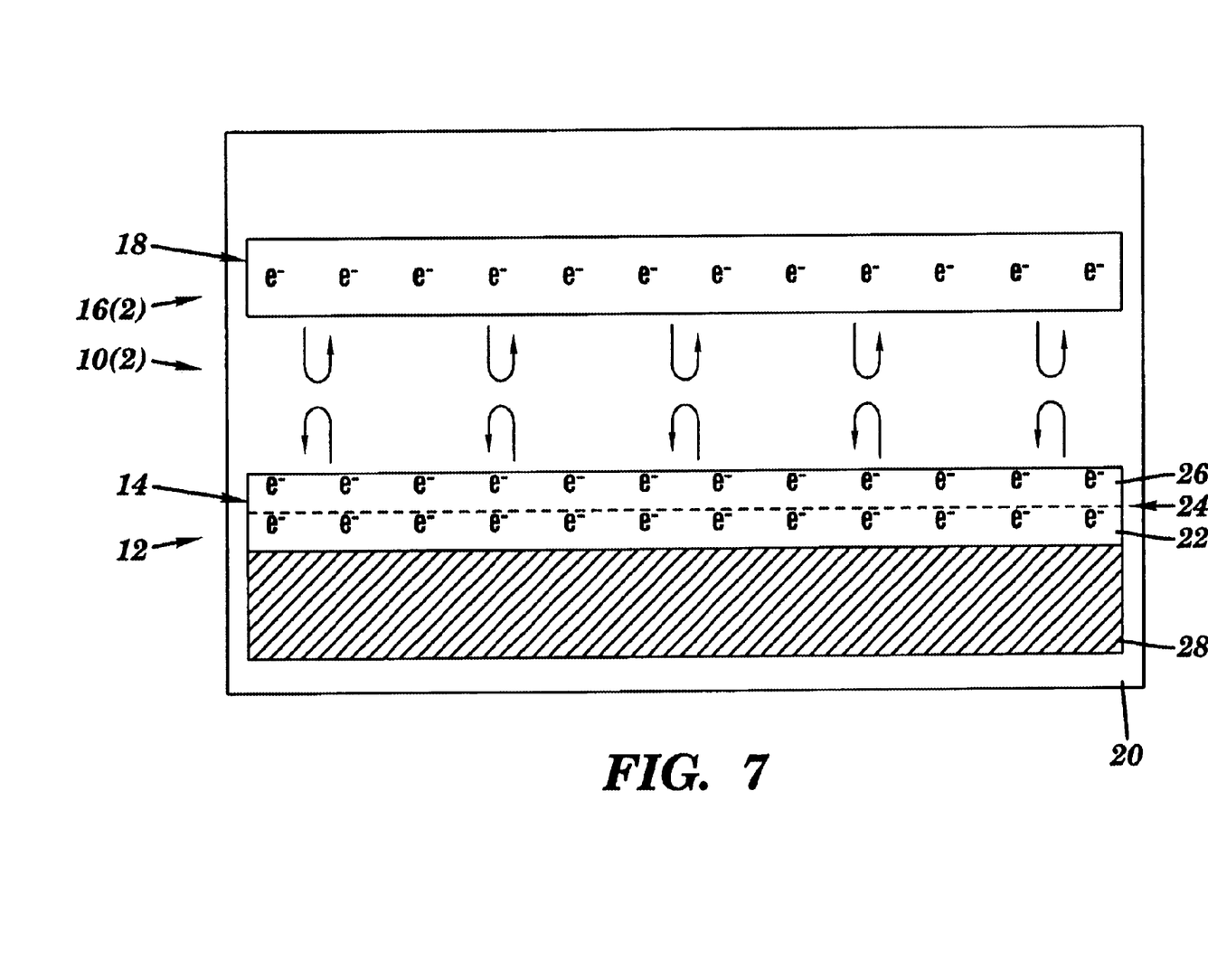
FIG. 7 is a cross-sectional view of an electrostatic levitation system in accordance with another embodiment of the present invention.
Figure 8:
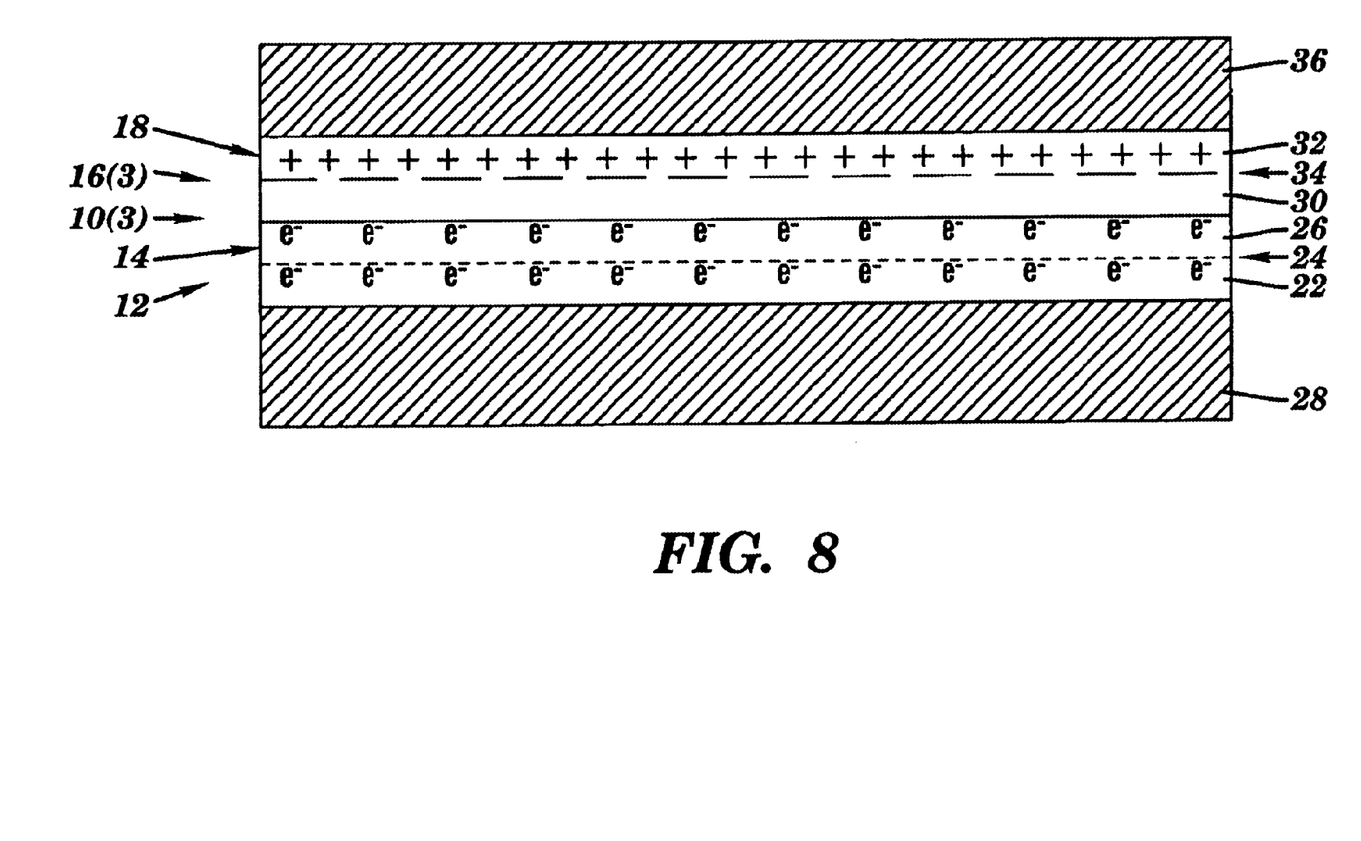
FIG. 8 is a cross-sectional view of an electrostatic attraction system in accordance with another embodiment of the present invention.

Electrostatic interaction systems 10(1)–10(3) in accordance with embodiments of the present invention are illustrated in FIGS. 6–8. The electrostatic interaction systems 10(1)–10(3) each include a first structure 12 having a first fixed electrostatic charge 14 and a second structure 16(1), 16(2), or 16(3) having a second fixed electrostatic charge 18. The polarity of the first and second fixed electrostatic charges 14 and 18 determines a positional relationship of the first structure 12 to the second structure 16(1), 16(2), or 16(3). The present invention provides electrostatic interaction systems, such as electrostatic levitation systems 10(1) and 10(2) and electrostatic attraction systems 10(3), for microscopic environments.

Referring to FIG. 6, an electrostatic levitation system 10(1) in accordance with one embodiment is illustrated. The system 10(1) may include a housing 20 for the first and second structures 12 and 16(1). A variety of different types of housings, such as a bearing case, with a variety of different configurations can be used.

The first structure 16(1) includes a first insulating layer 22, such as $SiO_2$, located on a second insulating layer 26, such as $Si_3N_4$, although other materials and other numbers of layers could be used. A first interface 24 is located between the first and second insulating layers 22 and 26 and the first fixed electrostatic charge 14 having a negative polarity is stored at the first interface 24, although the first fixed electrostatic charge 14 could have a positive polarity and depending on the number of layers, the first structure 12 can have more interfaces where fixed electrostatic charge can be stored. Although a first structure 12 made of first and second insulating layers 22 and 26 is shown, other types of members which can hold a fixed charge can also be used, such as an electret. The first stored fixed electrostatic charge 14 has a magnitude of at least $1 \times 10^{12}$ charges per $cm^2$, although the magnitude can vary depending on the application.

An optional first component 28, such as a machine part, is connected to the first insulating layer 22, although other types of first components can be used. The first component 28 is made of a conductive material, such as poly silicon, although other types of materials, such as an insulating material, can be used. If first component 28 is made of an insulating material, then other techniques for imbedding the fixed charge in the interface 24 may be used, such as using an electron gun.

The second structure 16(1) includes a third insulating layer 30, such as Si$_3$N$_4$, located on a fourth insulating layer 32, such as SiO$_2$, although other materials and other numbers of layers could be used. A second interface 34 is located at the interface between the third and fourth insulating layers 30 and 32 and the second fixed electrostatic charge 18 also having a negative polarity is stored at the second interface 34, although the second fixed electrostatic charge 18 could have a positive polarity and depending on the number of layers, the second structure 16(1) can have more interfaces where fixed electrostatic charge can be stored. Although a second structure 16(1) made of first and second insulating layers 30 and 32 is shown, other types of members which can hold a fixed charge can also be used, such as an electret. The second stored fixed electrostatic charge 18 has a magnitude of 1×10$^{12}$ charges per cm$^2$, although the magnitude can vary depending on the application.

An optional second component 36, such as a machine part, is connected to the fourth insulating layer 32, although other types of second components can be used. The second component 36 is made of a conductive material, such as poly silicon, although other types of materials, such as an insulating material, can be used. If second component 36 is made of an insulating material, then other techniques for imbedding the fixed charge in the interface 34 may be used, such as using an electron gun.

If the first and second stored fixed electrostatic charges 14 and 18 in the first and second structures 12 and 16(1) have the same polarity or sign, then an electrostatic repulsion force results which is sufficient to keep the two structures 12 and 16(1) in a spaced apart relation with each other. If the housing 20 is included it provides a casing to hold the first and second structures 12 and 16(1) in their spaced apart relation to each other. This embodiment mitigates of sliding friction and the short range stiction.

Referring to FIG. 7, an electrostatic levitation system 10(2) in accordance with another embodiment is illustrated. The electrostatic levitation system 10(2) is the same as the electrostatic levitation system 10(1) shown in FIG. 6, except as described below. Elements in FIG. 7 which are identical to those elements in FIG. 6 have like reference numerals. In this particular embodiment, the second structure 16(2) is an electret, such as a polymer with residual polarization charge, with a second stored fixed electrostatic charge 18, although other types of members which can hold a fixed charge can be used. Additionally, in this particular embodiment a second component 36 is not connected to the second structure 16(2), although other configurations are possible, such as having a second component 36 connected to the second structure 16(2), but not having a first component 28 connected to the first structure 12.

Referring to FIG. 8, an electrostatic attraction system 10(3) in accordance with another embodiment is illustrated. The electrostatic attraction system 10(3) is the same as the electrostatic levitation system 10(1) shown in FIG. 6, except as described below. Elements in FIG. 8 which are identical to those elements in FIG. 6 have like reference numerals. In this particular embodiment, the first structure 12 has a first a fixed electrostatic charge 14 with a negative polarity and the second structure 16(3) has a second fixed electrostatic charge 18 with a positive polarity, although other arrangements are possible, such as the first structure 12 having a first a fixed electrostatic charge 14 with a positive polarity and the second structure 16(3) having a second electrostatic fixed charge 18 with a negative polarity. Another possible arrangement is a fixed charge in one of the first and second structures and an induced charge in the other one of the first and second structures which will result in an electrostatic attraction force to keep the first and second structures together.

If the first and second stored fixed electrostatic charges 14 and 18 in the first and second structures 12 and 16(3) have the opposite polarity or sign, then an electrostatic attraction force results which is sufficient to keep the two structures 12 and 16(3) together.

Figure 1:
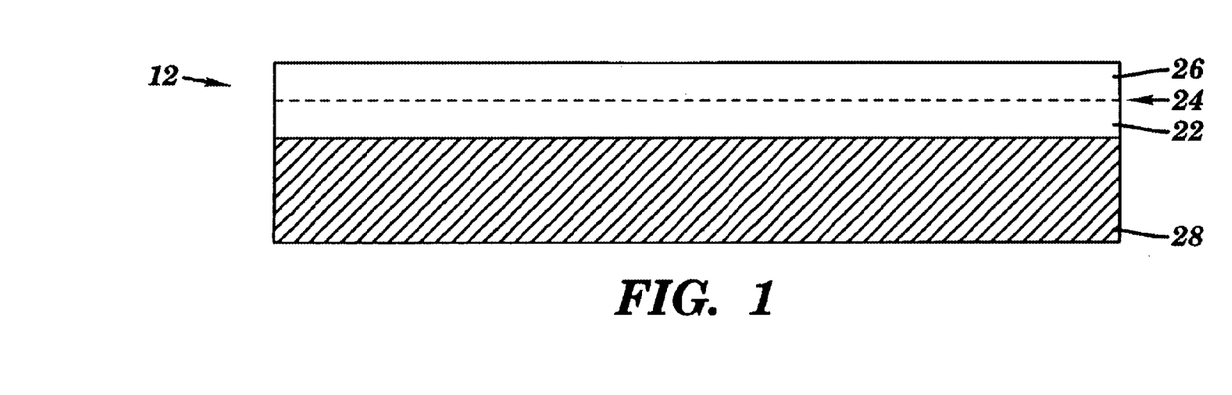
FIGS. 1–6 are cross-sectional view of a method of making an electrostatic levitation system in accordance with one embodiment of the present invention.

A method for making an electrostatic levitation system 10(1) in accordance with one embodiment is shown in FIGS. 1–6. Referring to FIG. 1, an insulating layer 22, such as SiO$_2$, is deposited on the first component 28, such as Si, and another insulating layer 26, such as Si$_3$N$_4$, is deposited on the insulating layer 22 to form a member with a high density of electronic charge traps at an interface 24 between layers 22 and 26, although other numbers of layers could be deposited, other materials could be used for each of the layers, and other types of members, such as a dual insulator graded interface, multiple delta layered interface, or an electret, could be used in place of insulating layers 22 and 26.

Figure 2:
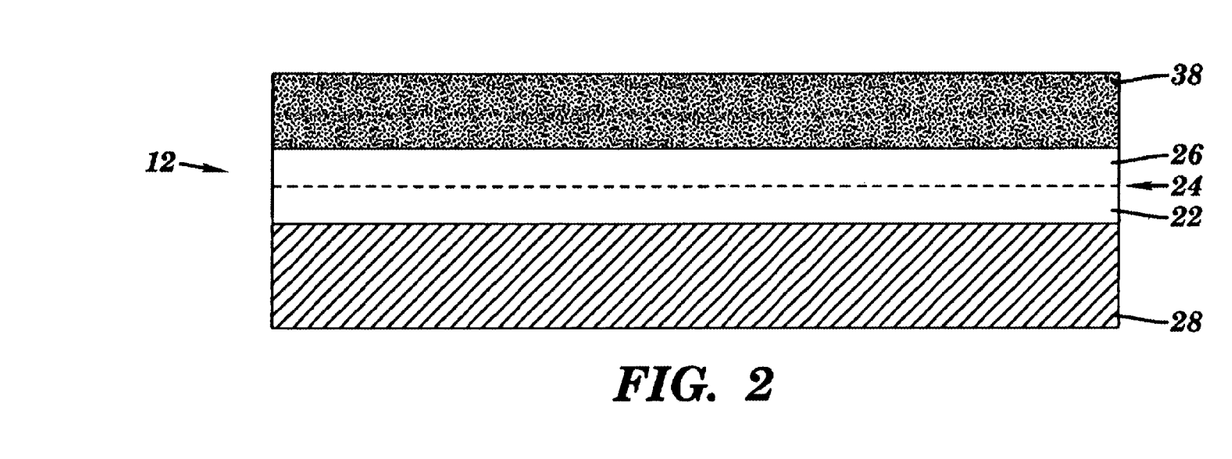

Referring to FIG. 2, a sacrificial conducting layer 38, such as poly silicon, is deposited on the insulating layer 26, although other types of materials could be used for layer 38.

Figure 3:
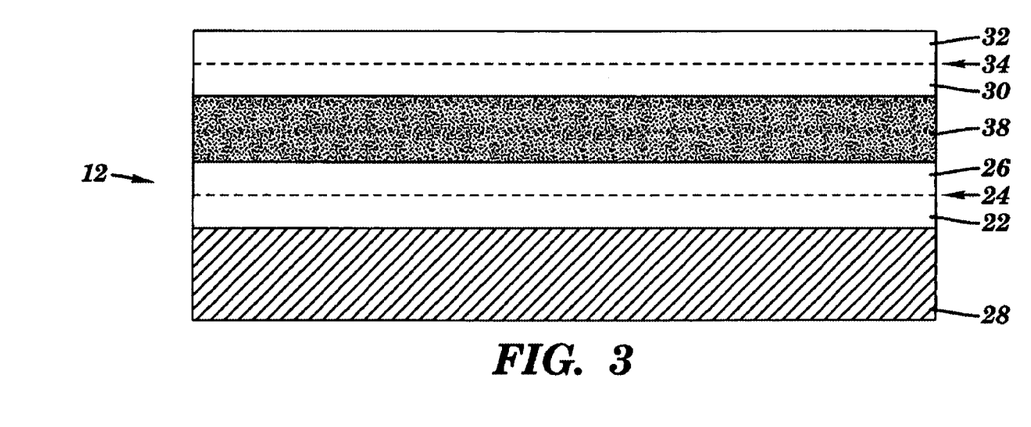

Referring to FIG. 3, an insulating layer 30 is deposited on the sacrificial conducting layer 38, such as Si$_3$N$_4$, and another insulating layer 32 is deposited on the insulating layer 30, such as SiO$_2$, to form a member with a high density of electronic charge traps at an interface 34 between layers 30 and 32, although other numbers of layers could be deposited, other materials could be used for each of the layers, and other types of members with a fixed electrostatic charge, such as an electret, could be used in place of insulating layers 30 and 32.

Figure 4:
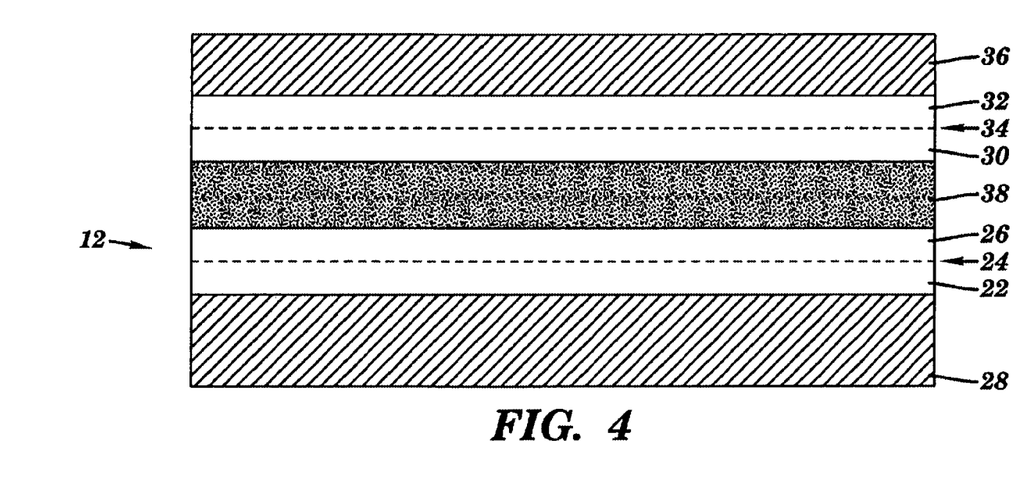

Referring to FIG. 4, a second component 36, such as Si, is connected to the insulating layer 32, although other types of materials could be used. For example, the second component 36 may be a conducting sacrificial layer which is subsequently removed using standard removal procedures for sacrificial layers, such as by chemical etching.

Figure 5:
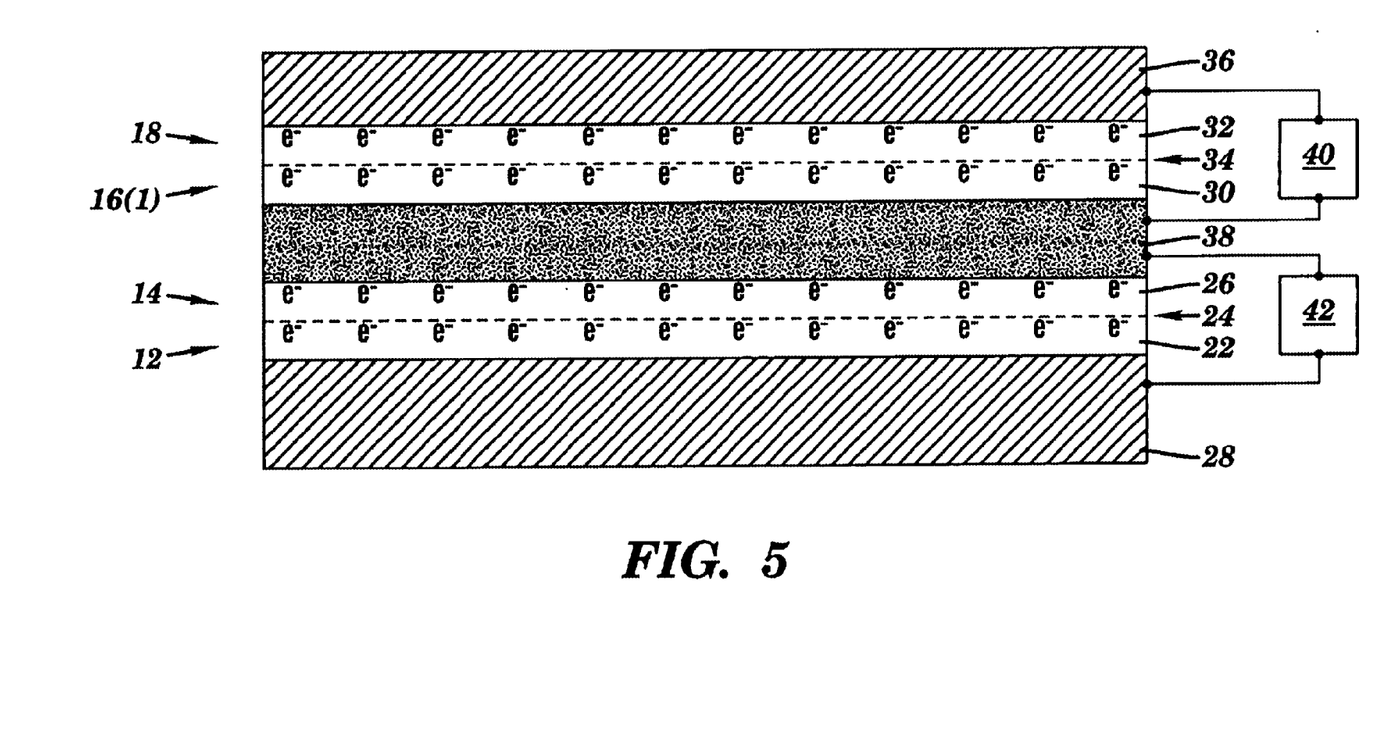

Referring to FIG. 5, an electrical bias from a power supply 42 is applied between the first component 28 and the sacrificial conducting layer 38 to cause electrons to be injected into the first structure 12. This in turn will cause electrons to be trapped at interface 24 between layers 22 and 26, although other techniques for injecting the electrons into the interface 24 could be used, such as using an electron gun or equilibrium charge from processing. Although the injection of electrons into the interface 24 is shown, other techniques can also be used, such as the extraction of electrons from the interface 24 to leave a net positive charge, i.e. hole injection, at the interface 24. Typically, higher charge levels can be obtained for the trapped electron case.

An electrical bias from a power supply 40 is also applied between the sacrificial conducting layer 38 and the second component 36, causing electrons to be trapped at the interface 34, although other techniques for injecting the electrons into the interface 34 could be used, such as using an electron gun or equilibrium charge from processing. Although the injection of electrons into the interface 34 is shown, other techniques can also be used, such as the extraction of electrons from the interface 34 to leave a net positive charge, i.e. hole injection, at the interface 34. Typically, higher charge levels can be obtained for the trapped electron case.

Referring to FIG. 6, once the fixed electrostatic charge 14 and 18 at the interfaces 24 and 34 has been obtained, the sacrificial layer 38 is removed. A variety of techniques for removing the sacrificial layer 38 can be used, such as by chemical etching. Again, the second component 36 may be a conducting sacrificial layer and subsequently be removed by standard process procedures at this time. The resulting first and second components 28 and 36 are held in a spaced apart relation by repulsive electrostatic forces from the fixed electrostatic charges 14 and 18 at the interfaces 24 and 34.

Referring to FIG. 7, the method for making the electrostatic levitation system 10(2) is the same as shown and described for making electrostatic levitation system 10(1), except that second structure 16(1) with insulating layers 30 and 32 is replaced with another second structure 16(2) which is an electret, although other members which can hold a fixed charge can be used for second structure 16(2) and for first structure 12.

Referring to FIG. 8, the method for making the electrostatic attraction system 10(3) is the same as shown and described with reference to FIGS. 1–6 for making electrostatic levitation system 10(1), except that the obtained fixed electrostatic charges 14 and 18 in the interfaces 24 and 34 is opposite to attract the structures 12 and 16(3) together. In this embodiment, electrons are injected into interface 24 and electrons are extracted from interface 34 to create the attraction force, although other arrangements can be used.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. An electrostatic interaction system comprising:
a first structure comprising at least a first pair of insulating layers with a first interface located at a junction between the first pair of insulating layers and with first fixed, monopole, electrostatic charges are stored at the first interface; and
a second structure comprising at least a second pair of insulating layers with a second interface located at a junction between the second pair of insulating layers and with second fixed, monopole, electrostatic charges are stored at the second interface;
wherein a polarity of the first and second fixed electrostatic charges determines a positional relationship of the first structure to the second structure.

2. The system as set forth in claim 1 wherein the polarity of the first and second fixed electrostatic charges is the same and holds the first and second structures in a spaced apart positional relationship with each other.

3. The system as set forth in claim 1 wherein the polarity of the first and second fixed electrostatic charges is opposite and attracts and holds the first and second structures together.

4. The system as set forth in claim 1 further comprising at least one component connected to one of the first and second structures.

5. The system as set forth in claim 1 further comprising a housing, the first and second structures located in at least a portion of the housing.

6. A method for making an electrostatic interaction system, the method comprising:
providing a first structure comprising at least a first pair of insulating layers with a first interface located at a junction between the first pair of insulating layers and with first fixed, monopole, electrostatic charges are stored at the first interface; and
providing a second structure comprising at least a second pair of insulating layers with a second interface located at a junction between the second pair of insulating layers and with second fixed, monopole, electrostatic charges are stored at the second interface;
wherein a polarity of the first and second fixed electrostatic charges determines a positional relationship of the first structure to the second structure.

7. The method as set forth in claim 6 wherein the polarity of the first and second fixed electrostatic charges is the same and holds the first and second structures in a spaced apart positional relationship with each other.

8. The method as set forth in claim 6 wherein the polarity of the first and second fixed electrostatic charges is opposite and attracts the first and second structures together.

9. The method as set forth in claim 6 further comprising providing at least a first component which is connected to one of the first and second structures.

10. The method as set forth in claim 6 further comprising providing a housing, the first and second structures located in at least a portion of the housing.

11. A method for making an electrostatic interaction system, the method comprising:
providing a first structure having a first fixed electrostatic charge; and
providing a second structure having a second fixed electrostatic charge, wherein a polarity of the first and second fixed electrostatic charges determines a positional relationship of the first structure to the second structure;
providing at least a first component which is connected to one of the first and second structures;
wherein the providing the first structure further comprises:
depositing a first insulating layer on the first component, at least a portion of the first component is made of a conductive material;
depositing at least a second insulating layer on the first insulating layer, a first interface is located at a junction between the first and second insulating layers; and
depositing a sacrificial layer on the second insulating layer, at least a portion of the sacrificial layer is made of a conductive material.

12. The method as set forth in claim 11 further comprising:
depositing a third insulating layer on the sacrificial layer; and
depositing a fourth insulating layer on the third insulating layer, a second interface is located at a junction between the third and fourth insulating layers.

13. The method as set forth in claim 12 further comprising connecting a second component to the fourth insulating material, at least a portion of the second component made of a conductive material.

14. The method as set forth in claim 13 further comprising:
applying a first electrical bias between the sacrificial layer and the first component to inject the first fixed electrostatic charge; and
applying a second electrical bias between the sacrificial layer and the second component to inject the second fixed electrostatic charge.

15. The method as set forth in claim 14 further comprising removing the sacrificial layer.

16. The method as set forth in claim 14 wherein a polarity of the first and second electrical biases is the same.

17. The method as set forth in claim 14 wherein a polarity of the first and second electrical biases is opposite.

18. An electrostatic levitation system comprising:
a first structure comprising at least a first pair of insulating layers with a first interface located at a junction between the first pair of insulating layers and with first fixed, monopole, electrostatic charges are stored at the first interface; and
a second structure comprising at least a second pair of insulating layers with a second interface located at a junction between the second pair of insulating layers and with second fixed, monopole, electrostatic charges are stored at the second interface;
wherein a polarity of the first and second fixed electrostatic charges is the same and holds the first and second structures in a spaced apart positional relationship.

19. The system as set forth in claim 18 further comprising at least one component connected to one of the first and second structures.

20. The system as set forth in claim 18 further comprising a housing, the first and second structures located in at least a portion of the housing.

21. An electrostatic attraction system comprising:
a first structure comprising at least a first pair of insulating layers with a first interface located at a junction between the first pair of insulating layers and with first fixed, monopole, electrostatic charges are stored at the first interface; and
a second structure comprising at least a second pair of insulating layers with a second interface located at a junction between the second pair of insulating layers and with second fixed, monopole, electrostatic charges are stored at the second interface;
wherein a polarity of the first and second fixed electrostatic charges is opposite which attracts and holds the first and second structures together.

22. The system as set forth in claim 21 further comprising at least one component connected to one of the first and second structures.

23. The system as set forth in claim 21 further comprising a housing, at least one of the first and second structures located in at least a portion of the housing.

* * * * *